United States Patent
Cosner et al.

[19]

[11] Patent Number: 6,019,444
[45] Date of Patent: Feb. 1, 2000

[54] STABILIZING ASSEMBLY FOR I/O PANEL IN COMPUTER HOUSINGS

[75] Inventors: Dirk D. Cosner; David R. Davis, both of Sioux City, Iowa

[73] Assignee: Gateway 2000, Inc., North Sioux City, S. Dak.

[21] Appl. No.: 09/169,222

[22] Filed: Oct. 9, 1998

[51] Int. Cl.[7] ....................................... H05K 7/18
[52] U.S. Cl. ........................... 312/223.2; 361/683
[58] Field of Search ................... 361/683, 684; 312/223.1, 223.2, 265.5, 265.6, 257.1, 263; 220/651, 653

[56] References Cited

U.S. PATENT DOCUMENTS

| | | | |
|---|---|---|---|
| 5,137,170 | 8/1992 | Matias | 220/651 X |
| 5,138,525 | 8/1992 | Rodriguez | 312/223.2 X |
| 5,164,886 | 11/1992 | Chang | 361/683 |
| 5,175,669 | 12/1992 | Navia et al. | 361/683 |
| 5,406,453 | 4/1995 | Cusato et al. | 361/683 X |
| 5,446,619 | 8/1995 | Madsen et al. | 312/223.2 X |

*Primary Examiner*—Janet M. Wilkens
*Attorney, Agent, or Firm*—Laurence R. Letson; Anthony Claiborne

[57] ABSTRACT

A stabilization assembly is used in computer housings to limit deflection of the I/O panel during handling and transit. The device has a lost motion connection permitting deflection of the I/O panel in one direction and preventing deflection in a second direction, thus both avoiding disconnection problems commonly incurred by I/O cards and their connections to the motherboard during handling or shipping and simplifying assembly.

10 Claims, 3 Drawing Sheets

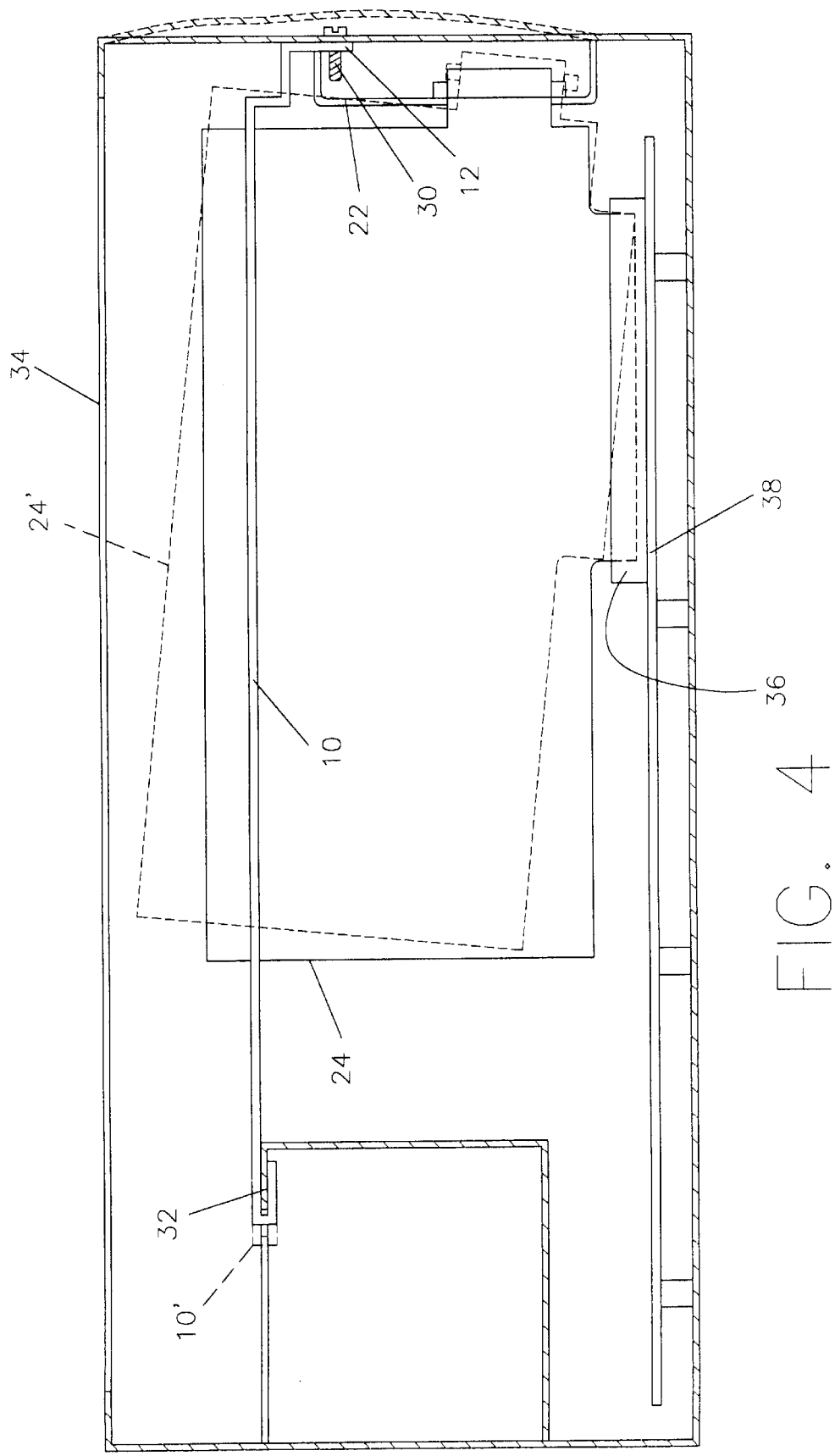

STABILIZING ASSEMBLY FOR I/O PANEL IN COMPUTER HOUSINGS

FIELD OF THE INVENTION

The present invention relates to the field of stabilizing and bracing structures and more specifically to braces and stabilizers for computer housings.

BACKGROUND OF THE INVENTION

The present invention is an improvement over existing computer housing construction in that this device keeps the Input/Output (I/O) panel, which usually is made of a relatively thin flexible metal, from flexing or deflecting one direction while permitting its deflection in the opposite direction. Usually found at the back or a side of a computer housing, the I/O panel allows the internal components of the computer to make or receive one or more of the numerous possible external connections or attachments to networks, printers or the other devices available in today's computer marketplace. I/O panels commonly have several slots or ports cut or formed in them. The cutting or forming of these ports in the I/O panel and weight necessitates the use of a relatively thin material. The combination of a relatively thin material with a multitude of openings results in an inherently weaker structure, more subject to deflection than a solid panel.

Further, because the I/O panel is used to mount the connectors through which connections are made to the circuit cards, deflection of the I/O panel may cause undesirable movement of the circuit card and subsequent disconnection from the connectors on the mother board. If the circuit cards are dislodged from the mother board connectors as the I/O panel deflects, these circuit boards may not subsequently realign and reseat in the connectors after the event causing the I/O panel deflection. However, deflected inwardly, the action is one of compression on the circuit boards, and the circuit boards will be forced into the mother board connectors and will not cause circuit disconnection.

The present invention is of particular interest and value as it prevents the I/O panel from flexing in one direction and, in turn, from pulling the I/O cards from their connections to the mother board, often during shipping or as the result of a fall.

The use of stabilizing members and bracing in computer housings is well known in the art. However, unlike the prior art, the present invention is designed to maintain the electrical connections between the mother board of the computer and the I/O cards actually are secured to the I/O panel. The present invention provides particular benefits during shipment should the computer housing be dropped or subjected to rough handling, thereby causing the I/O panel to buckle or deflect and further resulting in the disconnection or separation of the I/O cards from those connectors located on the mother board.

OBJECTS OF THE INVENTION

It is an object of the present invention to prevent any I/O cards secured to the I/O panel from becoming unseated or separated from their connections in or to the mother board during shipment or mishandling.

It is another object of the present invention to add stability to the I/O panel and to prevent outward deflection of the I/O panel.

It is a further object of the present invention to provide a low-cost, easily assembled and easily removable stabilizing assembly to correct and/or prevent problems incurred by the I/O panel, cards, and corresponding connections during handling and transit.

Other objects and advantages of the present invention will become apparent to those skilled in the art as the disclosure continues.

SUMMARY OF THE INVENTION

A stabilizing member, typically made of metal, spans between the I/O panel and an internal brace or structure interior to the computer housing. The internal brace is preferably a member with a flat panel perpendicular to the I/O panel of the computer housing. The stabilizing member is rigidly attached to the I/O panel and extends to the far edge of the flat panel of the internal brace. The end of the stabilizing member is shaped to form a hook which passes adjacent the flat panel, folds over and passes on the opposite side of the flat panel, hooking the internal brace.

The length of this stabilizing member is determined such that the edge of the internal brace engages the interior bend of the stabilizing member with the I/O panel in an unflexed condition. Whenever the I/O panel is deflected inwardly, the hook-end of the strap and the internal brace together form a lost motion connection, permitting deflection, uninhibited by the stabilizing member. Deflection of the I/O panel in an outward direction, moreover, creates a positive engagement of the interior of the hook with the edge of the brace and prevents movement of the stabilizing member and the I/O panel outward, thereby preventing the disconnection of the circuit boards from the mother board connectors.

BRIEF DESCRIPTION OF THE DRAWINGS

FIG. 4 is a sectioned view of the stabilizing member and the interior of the computer housing with the I/O panel shown both in an outwardly deflected position without the stabilizing brace installed and an outwardly deflected position as limited by the stabilizing member.

DETAILED DESCRIPTION OF THE INVENTION

Figure 1:
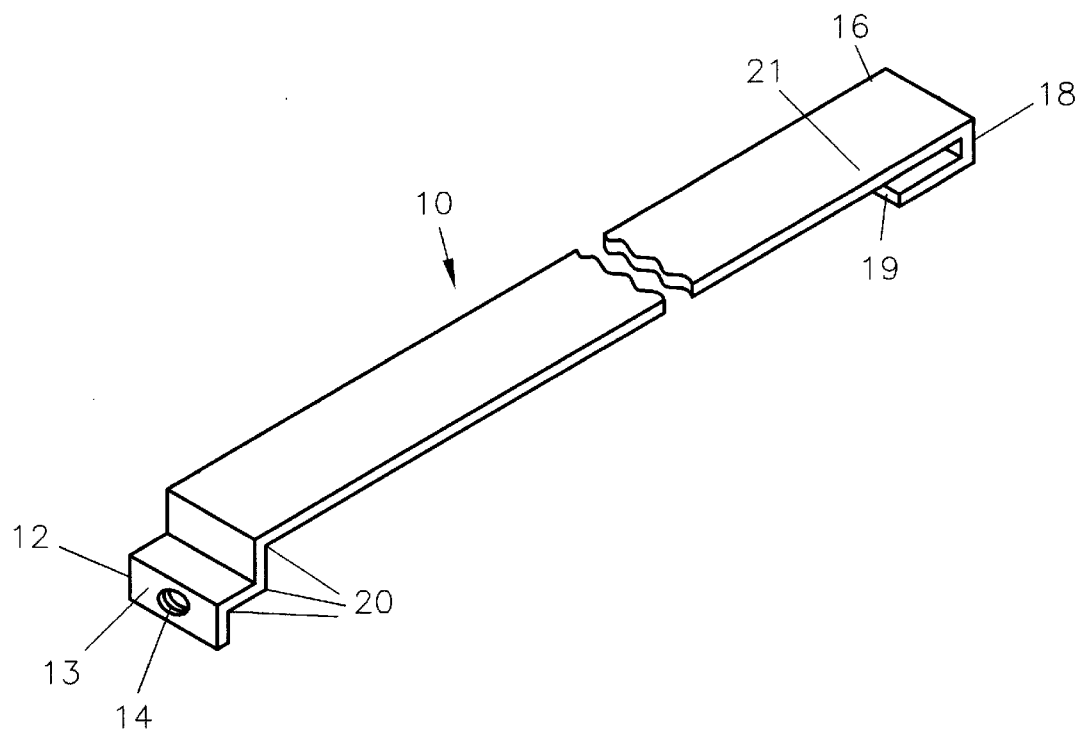
FIG. 1 is an elevated perspective view of the stabilizing member of this invention.

The preferred embodiment of the present invention is illustrated in FIG. 1. The stabilizing member or tension bracket 10 is an elongated flat member made of a non-extensible and relatively rigid material such as a high strength plastic or metal. Some bowing or flexing is acceptable in compression of the tension bracket 10 but is not extensible in tension. At one end 12 of elongated tension bracket 10, there is an opening or hole 14 which allows a screw 30 or other means of attachment such as a rivet (not shown) to be used to secure end 12 to the I/O panel 22, as can be seen in FIG. 3.

Referring to FIG. 1, the first end 12 of the tension bracket 10 can be bent or shaped as shown at bends 20 to create and dispose end surface 13 in a position best suited for mounting or attachment to the I/O panel 22.

At the opposite end or second end 16 of the elongated tension bracket 10, the member shown is shaped into a hook 18. The hook 18 is used to yieldingly engage the second end 16 of the tension bracket 10 to a structural bracket 32 or sub-member 32 of the frame 34 or computer housing 34, opposite the I/O panel 22, as illustrated in FIG. 3.

Figure 3:
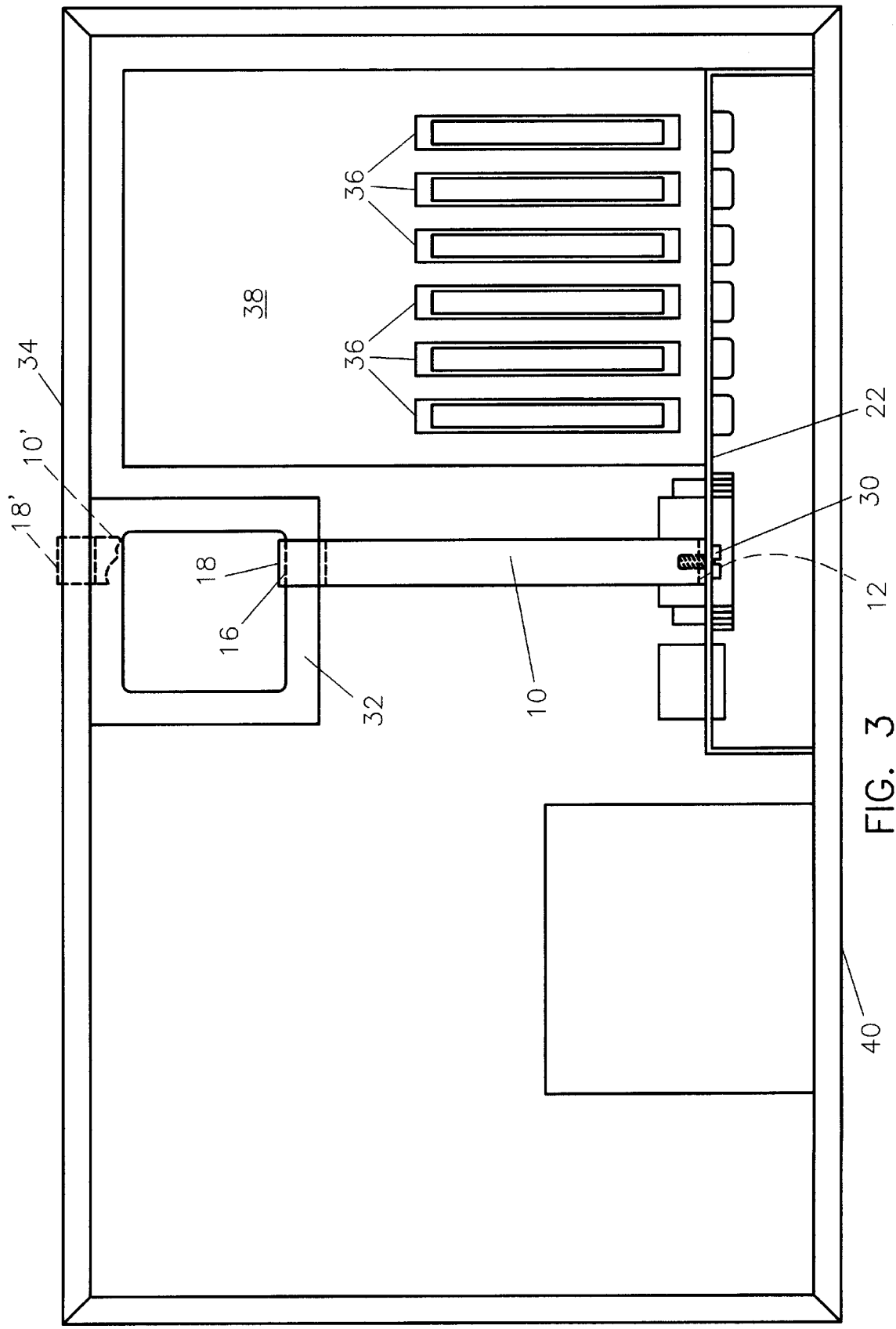
FIG. 3 is the top view of the stabilizing member as attached to a computer housing and I/O panel.

In FIG. 3, the tension bracket 10 is disposed to and allows the hook 18 to engage rigid internal member 32 in a manner which provides relief for movement of hook 18 relative to structural bracket 32. Hook shape 18 can be of sufficient depth to engage a thick bracket, if desired, and thus is usable not only on a flange but on other rigid members. Depth is the distance or separation between the tip 19 of hook 18 and the body 21 of tension bracket 10.

Figure 2:
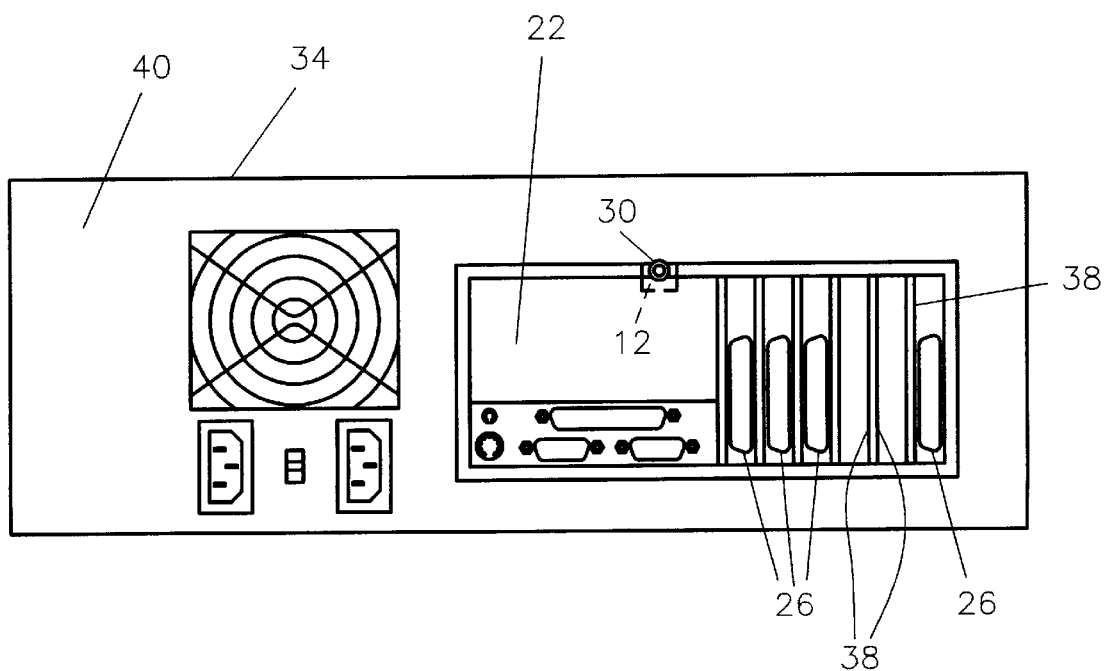
FIG. 2 is a view of the rear of a computer housing having an I/O connector panel, mounting one end of the stabilizing assembly member.

FIG. 2 shows an exterior end view of a back panel of a computer housing having an I/O panel 22, and I/O connectors 26. Shown in FIG. 2 is screw 30 or other securing means which passes through I/O panel 22, attaching tension bracket 10 to I/O panel 22. The openings 38, through which I/O connectors 26 extend, weaken the I/O panel 22; accordingly, weakened structures are a major source of the deflection problems addressed by this invention.

It should also be understood that other lost motion connections could be substituted for the hook shape 18 illustrated in FIG. 1. For example, both ends 12, 16 could be rigidly attached to the housing 34 and the I/O panel 22 and a lost motion connection disposed between the two ends 12, 16, permitting movement upon an inward bending of the I/O panel 22 and a rigid resistance to deflection in the outward direction.

As shown in FIGS. 3 and 4, utilization of the lost motion connection allows the manufacturer to support, stabilize or brace the I/O panel 22 against outward deflection and any possible resultant disconnections incurred by the I/O cards 24 and motherboard connectors 36. Bracket 10 allows inward deflection of the I/O panel without buckling or other adverse affects on the housing 34.

I/O cards 24 are fixedly secured to the I/O panel 22, so that whenever an outward deflection of the unstabilized I/O panel 22 occurs, the result of such deflection will be that the I/O cards 24 are pulled in the same outward direction. The effect of this outward deflection is to pull or rotate the I/O cards 24 slightly upwards and towards the back panel 40 or I/O panel 22. This rotation to position 24', as can be seen in FIG. 4, may result in I/O cards 24 becoming disconnected or unseated from their connector 36 on the motherboard 38 located inside the computer housing 34. However any inward deflection of the I/O panel is not of concern to the connections.

If and when an inward deflection of the I/O panel 22 occurs, separation between the cards 24 and the connectors 36 on the motherboard 38 will not occur. In fact such an inward deflection of panel 22 is likely to compress or firmly secure the connections 36 and such compression of the connections will resist further inward deflection. The stabilizing member 10 will be pushed to the position shown at 10' in FIG. 4.

The positioning and attachment of I/O panel 22 to housing 34 and I/O cards 24 prevents the separation of cards 24 and connectors 36 upon and inward deformation of I/O panel 22 and resists inward deflection of the I/O panel 22.

Utilizing a lost motion connection between the computer housing 34 and the tension bracket 10 is not detrimental to the connections between the I/O cards 24 and the mother board connectors 36 should the I/O panel 22 deflect slightly inward while resisting deflections of I/O panel 22. The lost motion connection formed by hook 18 and rigid internal member 32 allows the bracket 10 to slide relative to internal member 32 and not buckle or deform either internal member 32 or bracket 32.

However, as the I/O panel 22 deflects outwardly from the computer housing 34, there is a greater tendency for electrical connectors 36 and I/O cards 24 to become either fully or partially disconnected. With stabilizing member 10 installed, the engagement between stabilizing member 10 and internal member 32 will become rigid, thereby preventing the disconnection of the I/O card 24 from connectors 36.

FIG. 3 illustrates one of several possible methods or ways of attaching tension bracket 10 to the I/O panel 22 and a second stabilizing point, such as a rigid interior member or computer housing. Screw 30 is shown passing through I/O panel 22 and continuing through end 12 of tension bracket 10 to secure end 12 to the interior surface of I/O panel 22. The second end 16 of tension bracket 10, having hook 18, is slideably or yieldingly engaged with a rigid interior member 32. Alternatively, the connection could be by rivet or bolt.

An alternate attachment point of end 16' could be where tension bracket 10' extends to reach the computer housing 34 opposite and parallel to I/O panel 22. Hook 18' yieldingly engages the housing 34 rather than rigid interior member 32. This alternative embodiment is illustrated in dashed lines with the remainder of tension bracket 10 broken away and not shown.

It will be recognized that variations of the particular apparatus disclosed will occur to one skilled in the art without departing from the spirit of the invention. It is to be understood that the invention is not limited to the precise embodiments disclosed, and that various changes and modifications may be effected therein without departing from the scope or spirit of the invention. Accordingly, the invention is to be deemed limited only by the scope of the appended claims.

What is claimed is:

1. A stabilized computer housing comprising:

a rigid outer frame;

a panel subject to deforming deflection mounted on said outer frame;

a rigid member extending substantially parallel to said panel and supported by said outer frame;

a stabilizing elongated member extending between said rigid member and said panel;

said stabilizing elongated member rigidly attached to said panel and yieldingly engaged with the rigid member in a first direction of deflection of the panel and rigidly engaged by said rigid member preventing movement of the stabilizing member in a second direction of said panel deflection, and whereby deflection of said panel is permitted in the first direction of deflection and resisted in the second direction of deflection.

2. The computer housing of claim 1 wherein one end of the stabilizing elongated member is in a shape of a hook, and another end is formed for rigidly mounting the stabilizing member to the panel.

3. The computer housing of claim 1 in which the rigid member forms a bracing cross member.

4. The computer housing of claim 1 in which the rigid member is a rigid interior member of the computer housing.

5. The computer housing of claim 1 wherein the stabilizing member is made of a non-extensible material.

6. The computer housing of claim 1 where the stabilizing member is rigidly attached to the panel and is slideably mounted over the rigid member for movement relative to the rigid member in a direction of inward deflection of the panel and for rigid resistance to movement in a direction of outward deflection of the panel.

7. A computer housing assembly comprising:

a housing having a rigid outer frame and a panel subject to deforming deflection;

a rigid frame member extending substantially parallel to said panel, said rigid frame member supported by said housing;

a stabilizing elongated member extending between said rigid frame member and said panel and rigidly attached to said panel and engaged with said rigid frame member;

said engagement forming a lost motion connection between said stabilizing member and said rigid member, and whereby said rigid member prevents panel deflection in one direction and permits panel deflection in a second direction.

8. The assembly of claim 7 in which the rigid member is a bracing cross member.

9. The assembly of claim 7 in which the rigid member is a rigidly attached sub-member of the housing.

10. The assembly of claim 7 wherein the stabilizing member is non-extensible.

* * * * *